US005906732A

United States Patent [19]

Kohno

[11] Patent Number: 5,906,732
[45] Date of Patent: May 25, 1999

[54] APPARATUS FOR SEPARATING MINUTE SUBSTANCES IN LIQUID

[75] Inventor: Yasushi Kohno, Susono, Japan

[73] Assignee: Yazaki Corporation, Tokyo, Japan

[21] Appl. No.: 08/739,722

[22] Filed: Oct. 29, 1996

[30] Foreign Application Priority Data

Nov. 17, 1995 [JP] Japan .................................... 7-300254

[51] Int. Cl.$^{6}$ ...................................................... B01D 17/12

[52] U.S. Cl. ........................... 210/94; 210/96.1; 210/138; 137/883

[58] Field of Search ................................ 47/57.6; 118/23, 118/688, 712, 668, 676; 137/2, 561 R, 572, 624.11, 624.18, 624.27, 861, 862, 883, 613, 614; 210/85, 94, 96.1, 143, 252, 253, 257.1, 258; 251/129.01, 129.04, 129.15; 138/137, 140, 148

[56] References Cited

U.S. PATENT DOCUMENTS

| | | | |
|---|---|---|---|
| 3,791,517 | 2/1974 | Friedman . | |
| 3,836,299 | 9/1974 | Houston et al. | 47/57.6 |
| 4,515,274 | 5/1985 | Hollinger et al. | 209/3.1 |
| 4,806,357 | 2/1989 | Garrett et al. | 47/57.6 |
| 4,808,430 | 2/1989 | Kouno | 47/57.6 |
| 4,840,730 | 6/1989 | Saxena | 210/96.1 |
| 4,887,721 | 12/1989 | Martin et al. | 209/3.1 |
| 5,080,925 | 1/1992 | Kouno | 427/4 |
| 5,101,978 | 4/1992 | Marcus | 209/3.1 |
| 5,199,576 | 4/1993 | Corio et al. | 209/3.1 |
| 5,254,358 | 10/1993 | Kouno et al. | 427/4 |
| 5,328,598 | 7/1994 | Lohrl et al. | 210/96.1 |
| 5,421,882 | 6/1995 | Kouno et al. | 118/23 |
| 5,509,963 | 4/1996 | Kohno | 118/23 |
| 5,512,101 | 4/1996 | Kohno | 118/668 |
| 5,660,630 | 8/1997 | Kohno | 118/23 |

FOREIGN PATENT DOCUMENTS

| | | | |
|---|---|---|---|
| 0156367 | 10/1985 | European Pat. Off. . | |
| 62-266137 | 11/1987 | Japan . | |
| 63-197530 | 8/1988 | Japan . | |
| 91/00781 | 1/1991 | WIPO . | |
| WO91/15750 | 10/1991 | WIPO | 209/3.1 |

*Primary Examiner*—Joseph W. Drodge
*Attorney, Agent, or Firm*—Finnegan, Henderson, Farabow, Garrett & Dunner, L.L.P.

[57] ABSTRACT

An in-liquid small substance separation/recovery apparatus which can separate small substances in a liquid into discrete ones in large amounts, includes a branch tube having an inlet port, a discharge port, and a separation/recovery port, a sensor to detect the small substances in a fluid passing through the inlet port, a controller to close and open a pair of valves, one at the discharge port and another at the separation/recovery port, and equipped with timers to start clocking a predetermined length of time each time the sensor detects a small substance and to signal the controller to open the valve at the discharge port.

8 Claims, 7 Drawing Sheets

202
t1 t2 t3 t4 t5 t6 t7

SENSOR 11

SENSOR 21

PINCH COCK 13a

PINCH COCK 13b

PINCH COCK 23a

PINCH COCK 23b

TIMER T1
10 SECONDS

TIMER T2

APPARATUS FOR SEPARATING MINUTE SUBSTANCES IN LIQUID

BACKGROUND OF THE INVENTION

The present invention relates to an apparatus for separating individual minute substances in a liquid from one another.

Fields of application for such an apparatus include an artificial seed making, in which cell lumps and adventitious embryos in a liquid such as culture fluid are separated into individual substances. In the field of artificial seed making, a method of making droplets is disclosed in Japan Patent Preliminary Publication No. 63-197530 and 62-266137. With this method, substances such as adventitious embryos to be sealed in artificial seeds are simply dispersed in a fluid by agitation.

In the artificial seed making field, Japan Patent Preliminary Publication No. 6-62917 proposes an apparatus which picks up one by one individual adventitious embryos present in a liquid such as culture fluid.

The former apparatus, however, has a very low probability that minute substances to be sealed such as adventitious embryos are contained in droplets. In other words, there is a high possibility that no substances to be sealed are contained in droplets. Hence, a need arises to sort out at a later process artificial seed capsules that can be used as products.

Further, in the former apparatus, there is a very low probability that each of the droplets contains a single minute substance to be sealed such as adventitious embryo, i.e., there is a high possibility that each droplet contains two or more substances. The present technology has difficulty in culturing embryos in large amounts and incurs a large loss during the production of expensive adventitious embryos.

The latter apparatus, though it has no such problems as those of the former apparatus, is not suited for separating lumps of minute substances to be sealed, such as adventitious embryos, into individual substances and arranging them in line, and thus has a limitation in making large amounts of artificial seeds in a short period of time.

Under these circumstances, it is an object of this invention to provide an apparatus capable of separating large amounts of substances in a liquid reliably. Another object of this invention is to provide an apparatus capable of isolating substances in a liquid into single substances in large amounts reliably.

SUMMARY OF THE INVENTION

To achieve the above objectives, an in-liquid small substance separation apparatus according to claim 1 has the basic construction as shown in FIG. 1A. The apparatus consists of at least one small substance separation/recovery unit 1. The unit 1 includes a branch tube 10, which has an inlet port 10*a* into which a fluid containing small substances is supplied at a constant flow rate; a discharge port 10*c* for discharging only the fluid not containing the small substances; and a separation/recovery port 10*b* for separating and recovering small substances from the fluid. The unit further includes a sensor 11 for detecting a small substance in a fluid passing through the inlet port; open-close means 13*b*, 13*a* for opening and closing the discharge port and the separation/recovery port; and an open-close control means 200*a* that performs control to close the open-close means at the discharge port and open the open-close means at the separation/recovery port when the sensor detects the small substance.

In the above construction, upon detection by the sensor 11 of a small substance in the fluid passing through the inlet port 10*a*, the open-close control means 200*a* closes the open-close means 13*b* at the discharge port 10*c* and opens the open-close means 13*a* at the separation/recovery port 10*b*. Hence, the fluid supplied from the inlet port is discharged from the discharge port and the small substances in the liquid are separated and recovered from the separation/recovery port. It is therefore possible to minimize the amount of fluid not containing small substances that is discharged from the separation/recovery port.

The in-liquid small substance separation apparatus according to claim 2 is characterized in that, as shown in FIG. 1(*b*), a plurality of small substance separation/recovery units 1, 2 are connected in series, with their separation/recovery port and inlet port interconnected through the open-close means; that the open-close control means has timer means T1, T2 which start clocking a predetermined period—determined by the distance between the sensors and the separation/recovery port and the flow rate of the fluid—each time the small substance is detected by the sensors; and that the timing for opening the open-close means at the discharge port is controlled according to the clocking of the predetermined period by the timer means.

In the above configuration, because a plurality of small substance separation/recovery units are arranged in series, with their separation/recovery port and inlet port interconnected through the open-close means and because the timer means of the open-close control means start clocking the predetermined period—determined by the distance between the sensors and the separation/recovery port and the flow rate of the fluid—each time the sensors detect the small substance, so as to control the opening timing for the open-close means at the discharge port according to the clocking of the predetermined period, the fluid is discharged from the discharge port when the substance is not detected at the inlet port for a predetermined period, minimizing the amount of fluid not containing the small substances which is discharged from the separation/recovery port.

The in-liquid small substance separation apparatus according to claim 3 is characterized in that, as shown in the basic configuration diagram of FIG. 1(*c*), inlet ports of a plurality of small substance separation/recovery units 1, 3 are connected to the outlet ports 50*b*, 50*c* of the branch tube 50 that receives an incoming fluid containing small substances at its inlet port 50*a* and feeds the fluid to its branched outlet ports 50*b*, 50*c*.

In the above configuration, because the fluid containing small substances supplied to one inlet port is passed through a plurality of branched passages, even when the small substances are entered in lumps into the inlet port, they are scattered and broken into smaller pieces, reducing the likelihood that the small substances may be discharged in lumps at the separation/recovery ports and allowing the substances to be separated into discrete ones.

The in-liquid small substance separation apparatus according to claim 4 is characterized in that, as shown in the basic configuration diagrams of FIGS. 1A to 1C, compressed air is injected into the container 100 accommodating a fluid containing small substances to deliver by pressure the fluid containing small substances into the inlet port at a constant flow rate.

In this configuration, because the compressed air is injected into the container, which accommodates a fluid containing small substances, to supply the substance-laden fluid under pressure to the inlet port of the branch tube at a constant flow rate, delicate small substances can be supplied to the inlet port without being damaged.

DETAILED DESCRIPTION OF THE PREFERRED EMBODIMENTS

Figure 1B:
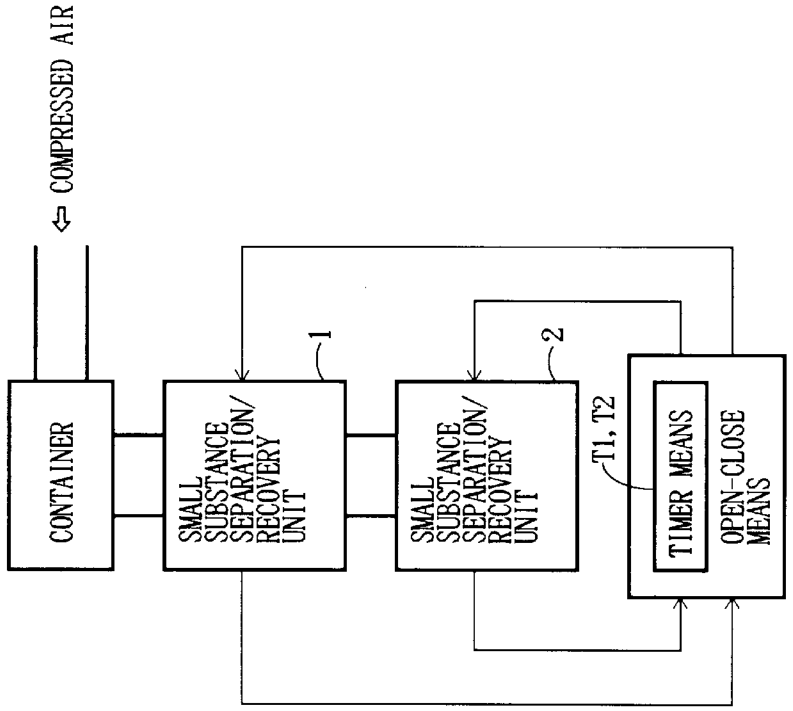
FIGS. 1A to 1C are block diagrams showing respectively a basic configuration of the in-fluid substance separation apparatus.
Figure 1A:
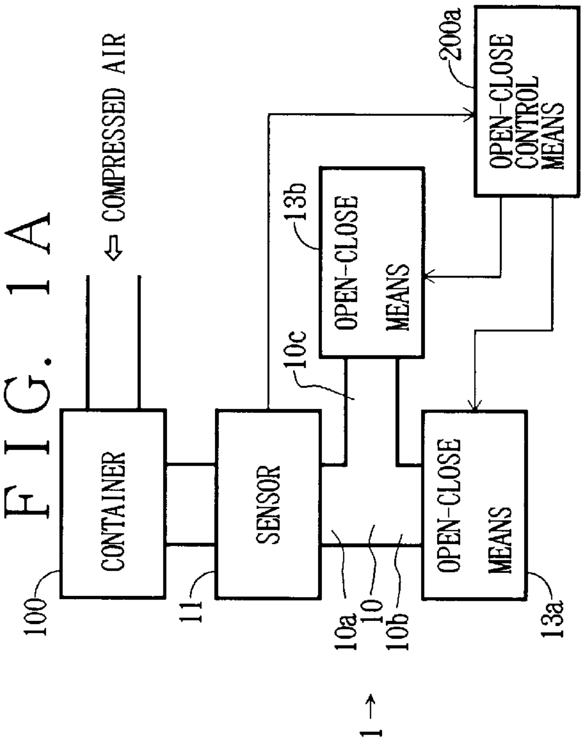
Figure 1C:
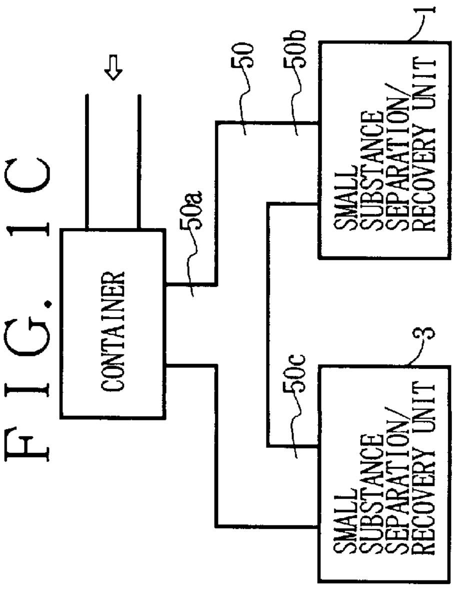
Figure 2:
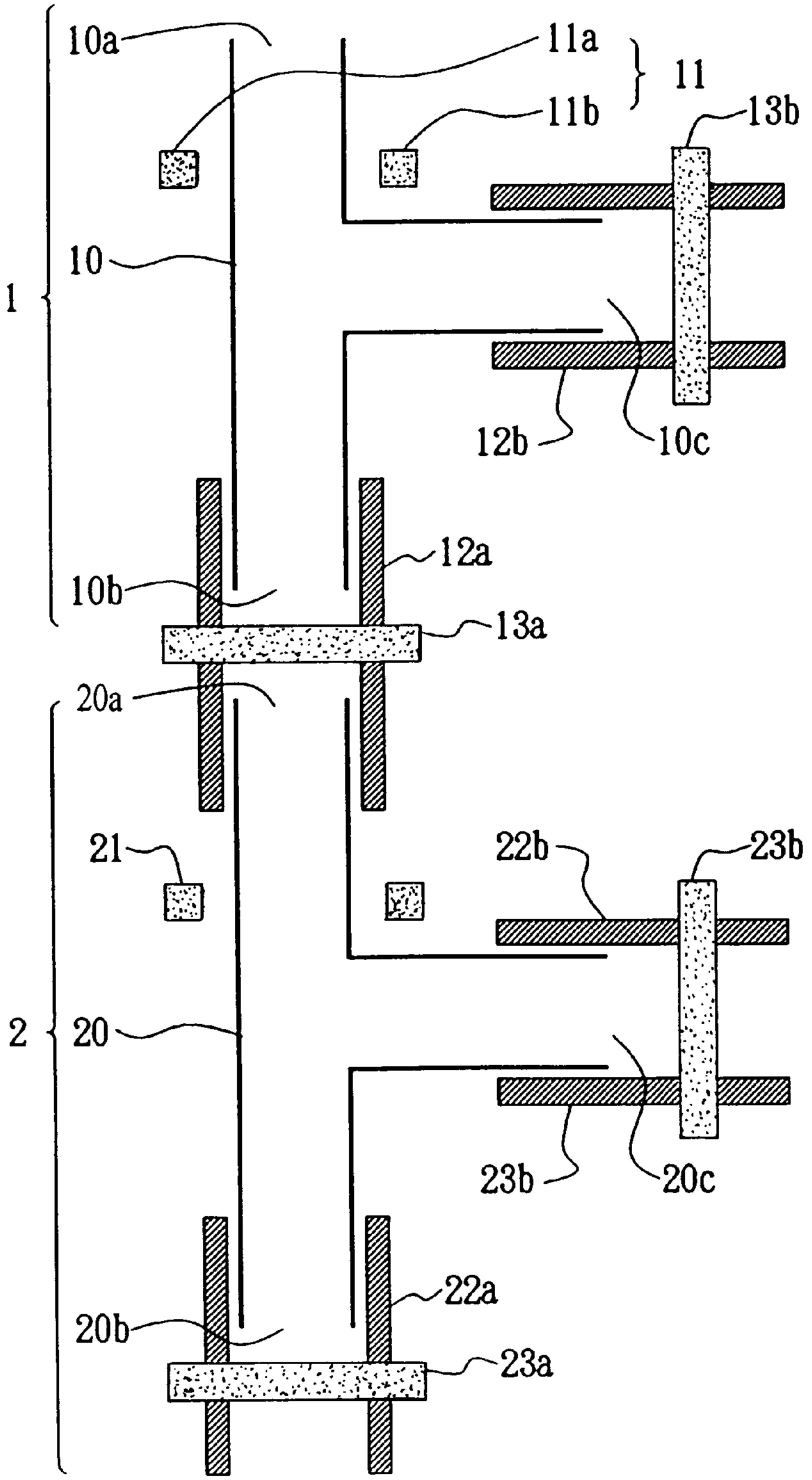
FIG. 2 is a schematic diagram showing the outline configuration of one embodiment of the in-fluid substance separation apparatus.

Now, preferred embodiments of the present invention will be described by referring to the accompanying drawings. FIG. 2 shows one embodiment of the apparatus for separating substances in a liquid according to this invention. In the figure, the in-liquid substance separating apparatus has two small substance separation/recovery units 1 and 2 connected in series.

These small substance separation/recovery units 1 and 2 have the same construction and thus only one of them will be described in detail. The small substance separation/recovery unit 1 has a branch tube 10 made of a T-shaped transparent glass tube. The branch tube 10 has a pair of openings 10*a* and 10*b* at the ends of a linear tube, of which 10*a* is an inlet port and 10*b* is a separation/recovery port. A horizontal tube perpendicular to the linear tube has a port 10*c* at the end, which is a discharge port. The discharge port 10*c* discharges a liquid extracted from a fluid containing small substances and supplied from the inlet port 10*a* at a constant flow rate. The separation/recovery port 10*b* separates and recovers small substances from the fluid supplied into the inlet port 10*a* and discharges them.

Figure 3:
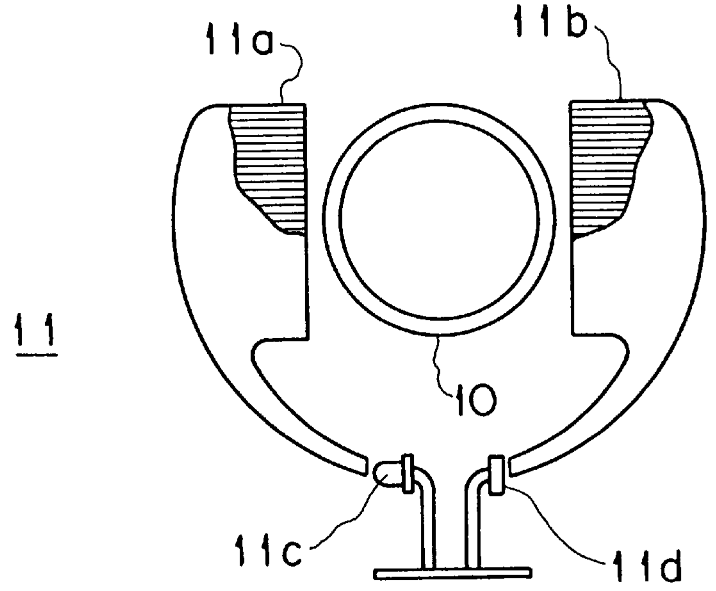
FIG. 3 is a schematic diagram showing a part of FIG. 2.

At a tube portion forming the inlet port 10*a* of the branch tube 10, a transmission type optical fiber sensor 11 for detecting small substances in a fluid passing through the inlet port 10*a* has its optical fiber sensor arrays 11*a* and 11*b*—which form a detection end of the sensor-arranged on opposing sides of the tube portion. The optical fiber sensor arrays 11*a* and 11*b*, as shown in FIG. 3, each consist of a large number of optical fibers bundled together which are made flat at one end and circular at the other, with the flat end portions of these arrays facing each other with the tube portion interposed therebetween.

Facing the circular end portions of the optical fiber sensor arrays 11*a*, 11*b* are light emitting devices 11*c*, 11*d*, respectively. Light emitted from the light emitting device 11*c* is introduced into the circular end portion of one optical fiber sensor array 11*a*, passed through the optical fiber sensor array 11*a* and then emitted from the flat end portion of the array 11*a*. The light is then applied to one side of the tube portion, through which it is passed and taken into the flat end portion of the other optical fiber sensor array 11*b*. The light is then led through the optical fiber sensor array 11*b* and out from the circular end portion of the array 11*b* and received by a light receiving device 11*d* arranged opposite the circular end portion of the array 11*b*.

When small substances in the fluid flowing past the inlet port 10*a*, reach the tube portion, the light emitted from the optical fiber sensor array 11*a* and irradiated against one side of the tube portion is partially blocked by small substances in the tube portion, reducing the intensity of light received by the flat end portion of the optical fiber sensor array 11*b*. Hence, by checking the level of an output signal of the light receiving device 11*d* that receives light emitted from the optical fiber sensor array 11*b*, it is possible to detect the small substances in the fluid passing through the inlet port 10*a*.

Elastic tubes 12*a*, 12*b* made of silicone resin are partly fitted over tube portions that form the separation/recovery port 10*b* and the discharge port 10*c*, respectively. Those parts of the elastic tubes 12*a*, 12*b* which are not fitted over the tube portions are provided with motor-driven pinch cocks 13*a*, 13*b* that open and close the separation/recovery port 10*b* and discharge port 10*c*, respectively.

The motor-driven pinch cocks 13*a*, 13*b* are applied electric signals for operation, or removed of applied electric signals, to pinch and flatten the elastic tubes 12*a*, 12*b* to close the separation/recovery port 10*b* and discharge port 10*c*. Alternatively, the electric signals to the motor-driven pinch cocks 13*a*, 13*b* are cut off or applied thereto for operation to cause the pinch cocks 13*a*, 13*b* to release the elastic tubes 12*a*, 12*b* to open the separation/recovery port 10*b* and discharge port 10*c*. The open-close control of the discharge port 10*c* and separation/recovery port 10*b* through the motor-driven pinch cocks 13*a*, 13*b* is performed by an open-close control unit not shown that receives a detection signal produced by the transmission type optical fiber sensor 11 when it detects small substances.

The small substance separation/recovery unit 2 has the similar construction to the unit 1 and has components 20, 21, 22*a*, 22*b* and 23*a*, 23*b* that correspond to the branch tube 10, transmission type optical fiber sensor 11, elastic tubes 12*a*, 12*b* and motor-driven pinch cocks 13*a*, 13*b* of the unit 1, respectively. The elastic tube 12*a*, one end of which is attached to the tube portion that forms the separation/recovery port 10*b* of the small substance separation/recovery unit 1, is longer than the elastic tube 12*b* attached to the discharge port 10*c*. The other end of the elastic tube 12*a* is elastically fitted over the tube portion that forms an inlet port 20*a* of the small substance separation/recovery unit 2, thus connecting the two small substance separation/recovery units 1, 2 in series.

To describe in more detail, the T-shaped transparent glass tube is 8 mm in inner diameter and 9 mm in outer diameter and is fitted with the elastic tubes, which are 8 mm in inner diameter and 10 mm in outer diameter, to form the branch tube as shown in FIG. 2. The elastic tubes are fitted over the glass tube so that the free end portions of the elastic tubes are 15 mm long. The free end portions of the elastic tubes are used to install the motor-drive pinch cocks that flatten the tubes to block the flow of fluid. The optical fiber sensor arrays are attached to the glass tube at a location 30 mm from the center of the branch.

Figure 4:
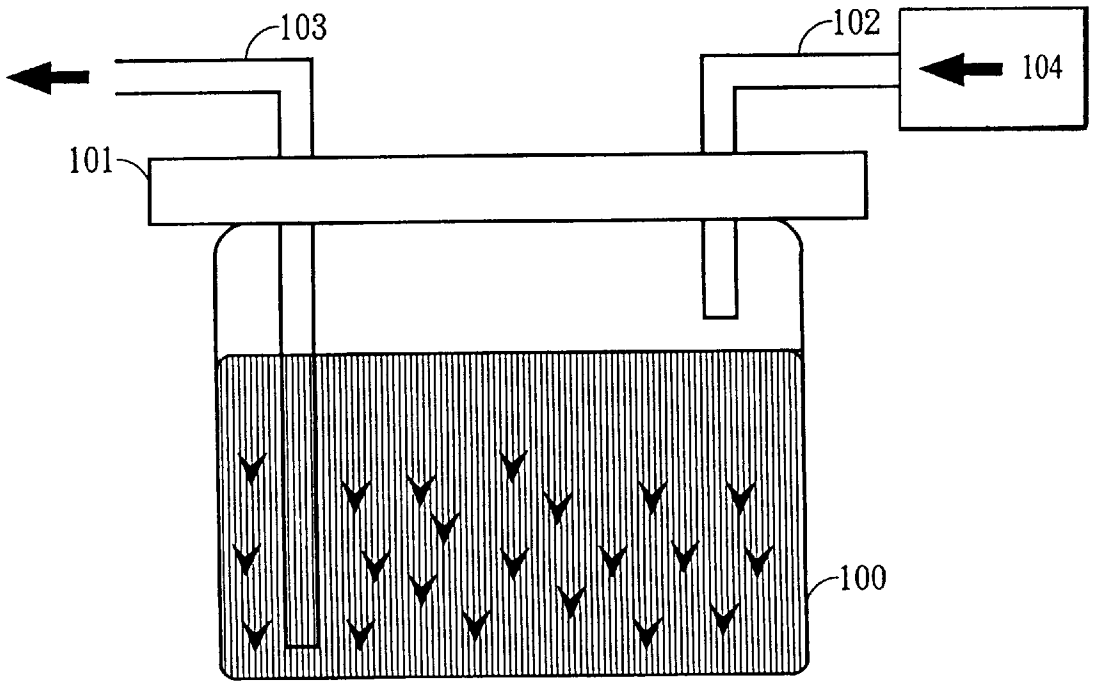
FIG. 4 is a schematic diagram showing a supply device applied to the apparatus of FIG. 2.

The fluid containing small substances and flowing into the inlet port 10*a* of the branch tube 10 of the small substance separation/recovery unit 1 is supplied at a constant flow rate from a substance supply device as shown in FIG. 4. The substance supply device has a sealed glass container 100 that contains small lumps of calluses of plants such as carrots and a liquid such as culture fluid. A cover 101 of the sealed glass container 100 has an air supply tube 102 and a feeding tube 103 passing therethrough. The air supply tube 102 supplies compressed sterile air from a compressor 104 and the feeding tube 103 feeds out a fluid containing small substances at a constant flow rate from the glass container 100. An inner end of the feeding tube 103 in the glass container 100 extends to the bottom of the glass container 100. When the inner pressure in the glass container 100 is increased by the compressed air supplied through the air supply tube 102, the liquid containing small substances in the glass container 100 is pushed out through the feeding tube 103.

Figure 5:
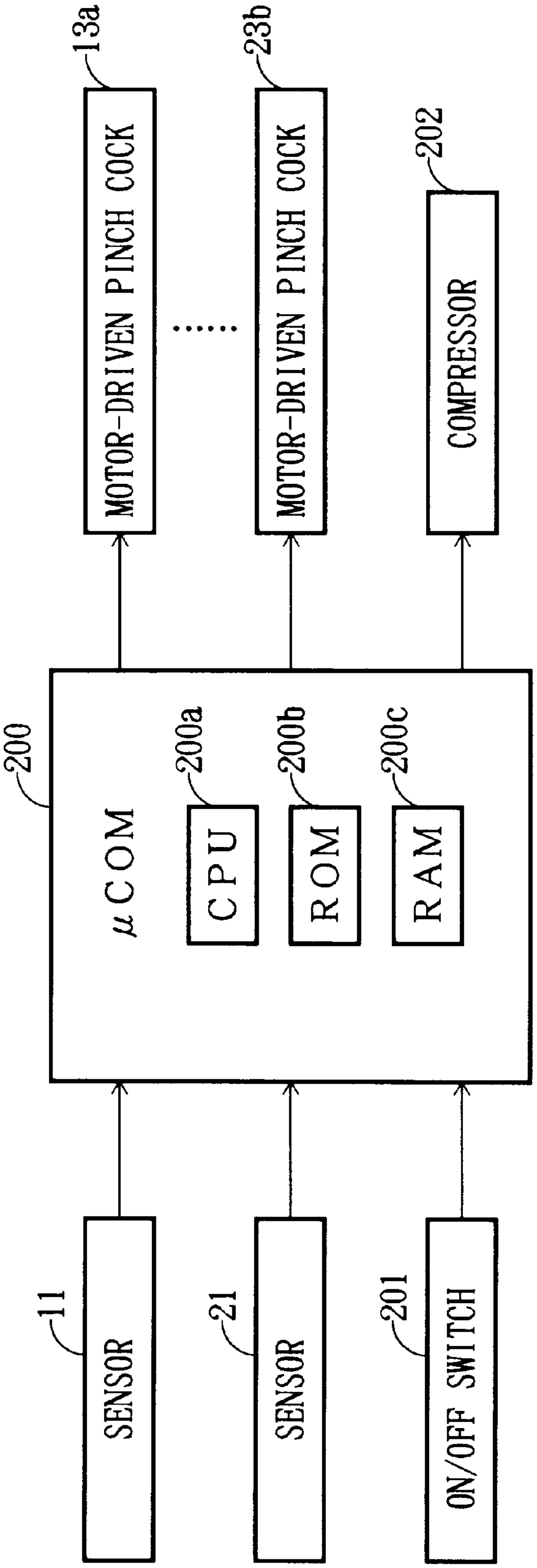
FIG. 5 is a block diagram showing the electric circuit configuration of the apparatus of FIG. 2.

The electric circuitry of the above in-fluid small substance separation/recovery apparatus is explained by referring to FIG. 5. The in-liquid small substance separation/recovery apparatus has a microcomputer (COM) 200, which includes a central processing unit (CPU) 200*a* that performs a variety of processing according to a program, a ROM 200*b* that stores this program, and a RAM 200*c* that has a data area storing various data and a work area used during execution of processing.

The microcomputer 200 is connected at its input with an on-off switch 201 to start and stop the operation of the apparatus and with the above transmission type optical fiber sensors 11, 21, and is also connected at its output with the motor-driven pinch cocks 13*a*, 13*b*, 23*a*, 23*b* and with a compressor 202 for generating compressed air. The CPU 200*a* of the microcomputer 200 functions as an open-close control means which, when the transmission type optical fiber sensors 11, 21 detect small substances, closes the discharge ports 10*c*, 20*c* with the motor-driven pinch cocks 13*a*, 23*a* and opens the separation/recovery ports 10*b*, 20*b* with the motor-driven pinch cocks 13*a*, 23*a*.

The CPU 200*a* of the microcomputer 200 starts timers (T1 and T2 described later) formed in the work area in the RAM 200*c* upon detection of small substances by the transmission type optical fiber sensors 11, 21 to clock a predetermined length of time, which is determined by the distance between the transmission type optical fiber sensors 11, 21 and the separation/recovery ports 10*b*, 20*b* and the flow rate of the fluid, and thereby control the opening timing of the motor-driven pinch cocks 13*b*, 23*b*.

With the above configuration, the glass container 100 is sterilized and, by changing the pressure of the compressed air injected into the glass container, the speed at which the calluses are moving together with the culture fluid in the glass tube can be changed. Table 1 shows the result of measurement of the moving speed of the calluses in the glass tube when the pressure in the glass container 100 was changed to 0.1, 0.2, 0.3, 0.4 and 0.5 kgf/cm2. In Table 1, 50 measurements were taken for each pressure and their averaged moving speeds are shown as representative values. To prevent the calluses from being influenced by gravity, the glass tube is installed horizontally. The feeding tube 103 is a glass tube, 8 mm in inner diameter and 9 mm in outer diameter, which is connected to the apparatus through an elastic tube, 8 mm in inner diameter and 10 mm in outer diameter.

TABLE 1

| | Pressure in glass container [kgf/cm2] | | | | |
|---|---|---|---|---|---|
| | 0.1 | 0.2 | 0.3 | 0.4 | 0.5 |
| Moving speed [mm/s] | 6.0 | 12.4 | 18.6 | 23.2 | 31.3 |

In substance supply device shown in FIG. 4, a culture fluid and carrot calluses are put in the glass container and compressed sterile air of 0.2 kgf/cm2 is fed into the glass container to feed the carrot calluses to the inlet port 10*a* of the branch tube 10 of the small substance separation/recovery unit 1 shown in FIG. 2. Table 2 shows the result of comparison between the number of calluses that have entered the inlet port 10*a* and the number of calluses recovered at the separation/recovery port 20*b*. In Table 2, the number of recoveries represents the number of times that the calluses reach the separation/recovery port 20*b*. As is seen form Table 2, almost all the calluses supplied under pressure from the glass container 100 were able to be recovered at the separation/recovery port 20*b*.

TABLE 2

| Number of calluses supplied | Number of calluses recovered | Number of recoveries |
|---|---|---|
| 100 | 89 | 32 |
| 100 | 93 | 28 |
| 100 | 86 | 41 |
| 100 | 83 | 26 |

When the on-off switch 201 is turned on to start the operation of the apparatus, the microcomputer 200 opens the motor-driven pinch cock 13*b* at the discharge port 10*c* and closes the motor-driven pinch cocks 13*a*, 23*a*, 23*b* and at the same time operates the compressor 202 to supply compressed air sterilized by a sterilization device not shown to the glass container 100. As a result, the carrot calluses are supplied under pressure from the glass container 100 together with the culture fluid. Until the carrot calluses are detected by the transmission type optical fiber sensor 11, the motor-driven pinch cock 13*b* is open with other pinch cocks closed, discharging all the culture fluid from the discharge port 10*c* of the branch tube 10. The culture fluid thus discharged is recirculated through a tube not shown to the glass container 100.

When a carrot callus is detected by the transmission type optical fiber sensor 11, the motor-driven pinch cocks 13*a*, 23*b* are opened and the motor-driven cocks 13*b*, 23*a* are closed to cause the calluses to flow toward the separation/recovery port 10*b*. The motor-driven pinch cock 13*b* is closed only for 10 seconds after the transmission type optical fiber sensor 11 has detected the carrot callus. This period of 10 seconds is sufficient for the carrot callus detected by the transmission type optical fiber sensor 11 to reach the separation/recovery port 10*b*. This period is determined by the distance between the transmission type optical fiber sensor 11 and the separation/recovery port 10*b* and by the flow speed of the fluid.

If the transmission type optical fiber sensor 11 detects another callus while the microcomputer 200 is clocking the 10-second duration after the detection of a previous carrot callus by the transmission type optical fiber sensor 11, the 10-second clocking is started again at this point. The motor-driven pinch cock 13*b* is closed when the transmission type optical fiber sensor 21 detects a callus. When a callus is detected by the transmission type optical fiber sensor 11 before the transmission type optical fiber sensor 21, a priority is given to the detection by the transmission type optical fiber sensor 11.

When the transmission type optical fiber sensor 21 detects a callus, the motor-driven pinch cock 23*b* is closed and the motor-driven pinch cock 23*a* is opened, causing the callus to be recovered from the separation/recovery port 20*b*. The motor-driven pinch cock 23*b* will be opened 10 seconds later. If, however, the transmission type optical fiber sensor 21 detects another callus before the 10-second duration elapses, the 10-second clocking is restarted at this point.

Figure 6:
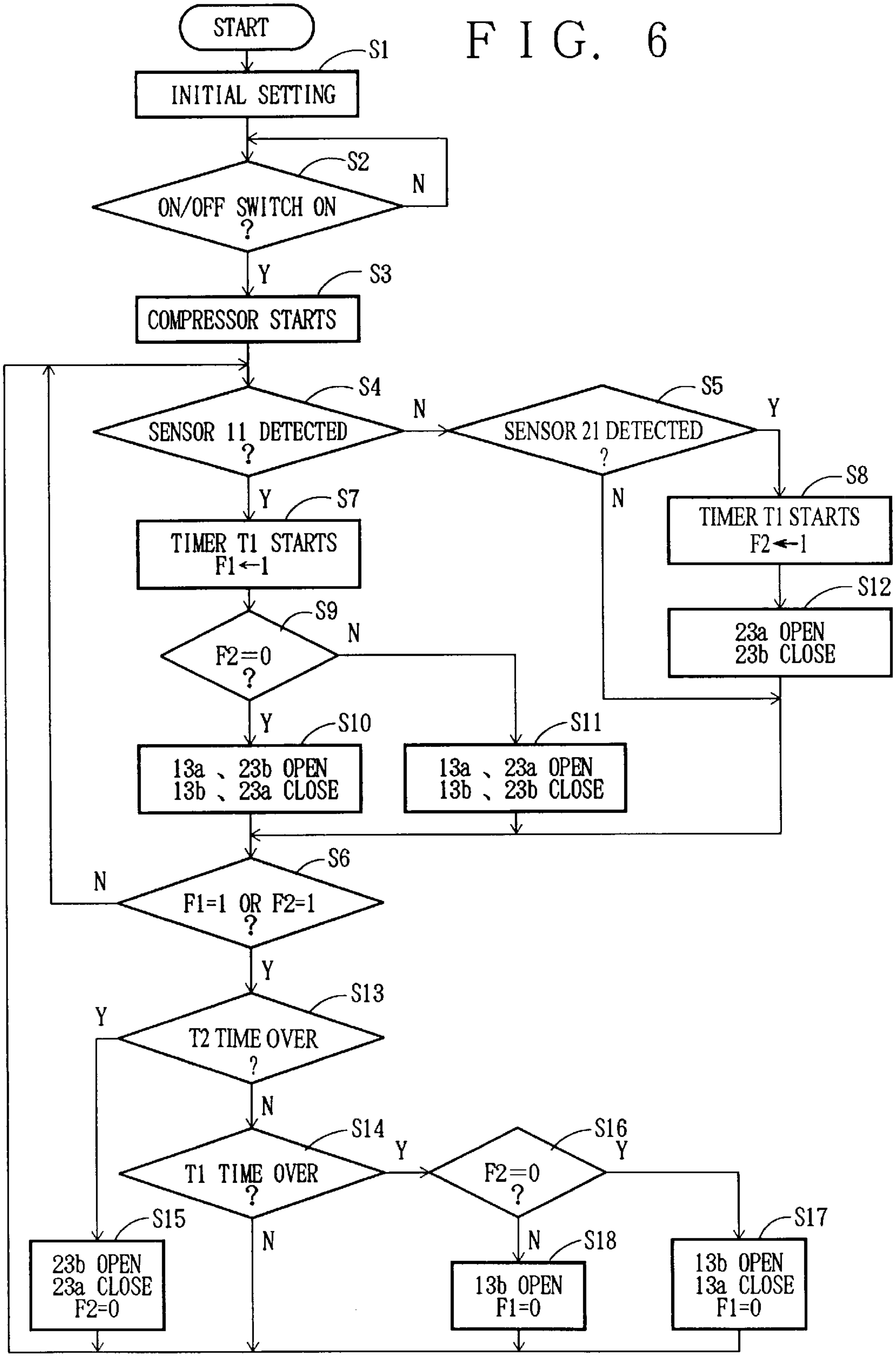
FIG. 6 is a flow chart showing the processing performed by the CPU of FIG. 5.
Figures 7A, 7B, 7C, 7D, 7E, 7F, 7G, 7H, 7I:
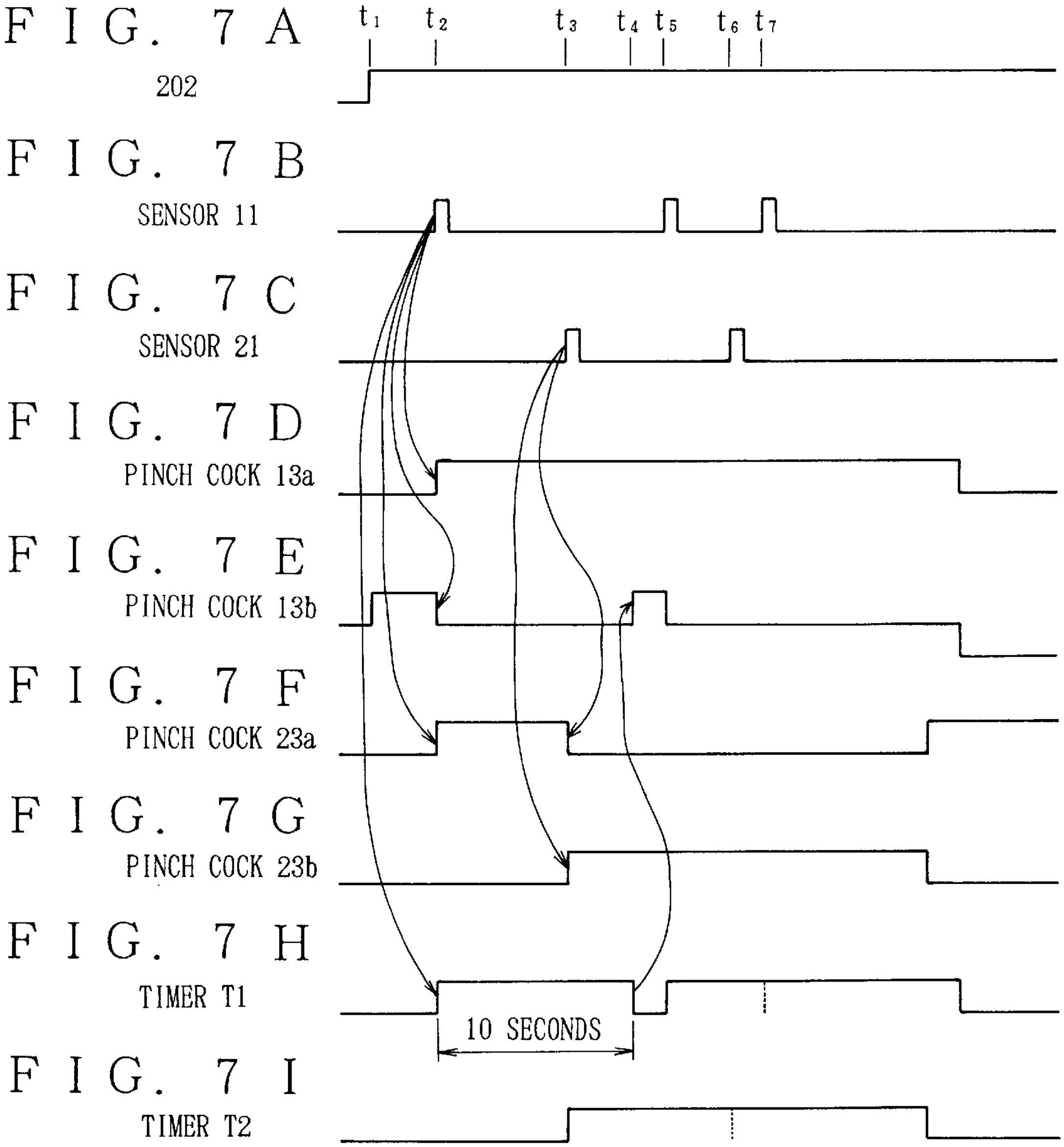
FIGS. 7A to 7I are timing charts used to explain the operation of the apparatus of FIG. 2.

The operation of the apparatus of FIG. 2, which was briefly described above, will be explained in more detail by referring to the flow chart of FIG. 6 that illustrates the processing that the CPU 200*a* in the microcomputer 200 performs according to the program.

The CPU 200*a* starts when power is turned on, and as its first step S1 performs an initial setting. In this initial setting, only the motor-driven pinch cock 13*a* is opened and other pinch cocks 13*b*, 23*a*, 23*b* closed. Next, the CPU 200*a* moves to step S2 where it waits for the on-off switch to be turned on. When the on-off switch 201 is turned on and the decision of step S2 is "yes," it starts the compressor 202 at step S3. Then at step S4 it checks whether the transmission type optical fiber sensor 11 has detected a callus. If the decision of this step S4 is "no," the program moves to step S5 where it checks if the transmission type optical fiber sensor 21 has detected a callus. If the decision of this step is also "no," the program proceeds to step S6 to check if a timer flag F1 or F2, which indicates that the timer T1 or T2 is running, is "1." If neither flag is "1," the program returns to the step S4.

If the decision of step S4 is "yes," i.e., the transmission type optical fiber sensor 11 detects a callus, the program moves to step S7 where it starts the timer T1 and sets a flag F1 to "1" indicating that the timer T1 is running. When the decision of step S5 is "yes," the program moves to step S8 to start the timer T2 and set the flag F2 to "1" indicating that the timer T2 is running.

After execution of step S7, the program moves to step S9 where it checks whether the flag F2, which indicates that the timer T2 has started, is "0." If the flag F2 is "0" and the decision of this step is "yes," then the program moves to step S10. At step S10, the CPU 200*a* opens the motor-driven pinch cocks 13*a*, 23*b* and closes the motor-driven pinch cocks 13*b*, 23*a* before moving to step S6. The decision at step S6 becomes "yes" because the flag F1 was set in step S7, and the program moves to step S13, which is described later. When the decision at step S9 is "no," i.e., when the flag F2 is "1" and the timer T2 has started, the program proceeds to step S11 where it opens the motor-driven pinch cocks 13*a*, 23*a* and closes the pinch cocks 13*b*, 23*b*, before moving to step S6.

After execution of step S8, the program moves to step S12 where it opens the pinch cock 23*a* and closes the pinch cock 23*b* before moving to step S6. When the decision of step 6 is "yes," i.e., the timer T1 or T2 has started, the program moves to step S13 to check if the timer T2 is ended. When the decision of step S13 is "no," the program moves to step S14 to check if the timer T1 is finished. If the decision of step S14 is also "no," the program returns to step S4. When the decision of step S13 is "yes," i.e., the timer T2 is finished, the program moves to step S15 where it opens the pinch cock 23*b*, closes the pinch cock 23*a* and sets the flag F2 to "0" before returning to step S4.

When the decision of step S14 is "yes," i.e., the step S14 decides that the timer T1 is finished, then the program moves to step S16 to check if the flag F2 is "0," i.e., whether the timer T2 is clocking or not. When the step S16 decides that the timer T2 is not clocking, the program moves to step S17 where it opens the pinch cock 13*b*, closes the pinch cock 13*a* and sets the flag F1 to "0" before returning to step S4. When, on the other hand, the step S16 decides that the timer T2 is clocking, the program moves to step S18 where it opens the pinch cock 13*b* with the pinch cock 13*a* left open and sets the flag F1 to "0" before returning to step S4.

Next, an example of operation is explained by referring to the timing charts of FIGS. 7A through 7I. When at time t1 the on-off switch is turned on, the CPU 200*a* activates the compressor 202 and turns on the motor-driven pinch cock 13*b* while leaving the other pinch cocks 13*a*, 23*a*, 23*b* turned off. Hence, the compressed air injected causes the small substances in the glass container 100 to be pushed out together with the liquid, with the liquid discharged from the open discharge port 10*c*.

Then, at time t2, when the sensor 11 detects a small substance, the CPU 200*a* starts the timer T1, turns off the pinch cock 13*b* and turns on the pinch cocks 13*a*, 23*a*. The liquid therefore is discharged through the separation/recovery port 10*b* and inlet port 20*a* from the discharge port 20*c*. Then, at time t3, when the sensor 21 detects a small substance, the CPU 200*a* starts the timer T2, turns on the pinch cock 23*b* and turns off the pinch cock 23*a*. As a result, the liquid flows through the discharge port 20*c* allowing the small substances to be recovered from the port 20*c*.

Then at time t4, when the timer T1 finishes clocking the fixed length of time, 10 seconds for example, the CPU 200*a* turns on the motor-driven pinch cock 13*b*. At this time, however, because the timer T2 is still clocking, the pinch cock 13*a* is held turned on, so that the liquid will flow through both the discharge port 10*c* and the separation/recovery port 10*b*. At time t5, when the sensor 11 detects a small substance, the timer T1 is started and the pinch cock 13*b* is turned off, causing the fluid to flow through the separation/recovery port 10*b* into the inlet port 20*a*.

When, at time t6, the sensor 21 detects a small substance within the predetermined 10-second clocking period of the point t3, the timer T2, which has not yet finished clocking, is restarted to clock another 10-second period, holding the pinch cocks 23*a*, 23*b* in their previous states. Further, when at time t7 the sensor 11 detects a small substance within the predetermined 10-second period of the time t5, the timer T1, which has not yet finished clocking, is restarted to clock another 10-second period, holding the pinch cocks 13*a*, 13*b* in their previous states. With the above operation repeated, the fluid not containing the small substances is discharged from the discharge ports 10*c* and 20*c* while at the same time the small substances are separated and recovered from the separation/recovery port 23*b*.

With the configuration shown in FIG. 2, as is evident from Table 2, it was difficult to separate the calluses into single discrete ones because the calluses flow in lumps. To prevent the calluses from flowing in lumps, the culture fluid and calluses in the glass container 100 need to be agitated by a magnetic stirrer to disperse the calluses in the fluid.

Table 3 shows comparison between the number of cal-luses supplied and the number of calluses recovered at the separation/recovery port 20*b* under the same condition as in the configuration of FIG. 2 except that the interior of the glass tube 100 is agitated. Table 3 shows that disturbing the calluses in the glass container 100 prevented them from combining together at the recovery position and that about 80% of the calluses supplied was able to be separated into discrete calluses.

TABLE 3

| Number of calluses supplied | Number of calluses recovered | Number of recoveries |
|---|---|---|
| 100 | 92 | 81 |
| 100 | 96 | 73 |
| 100 | 90 | 79 |
| 100 | 93 | 68 |

Figure 8:
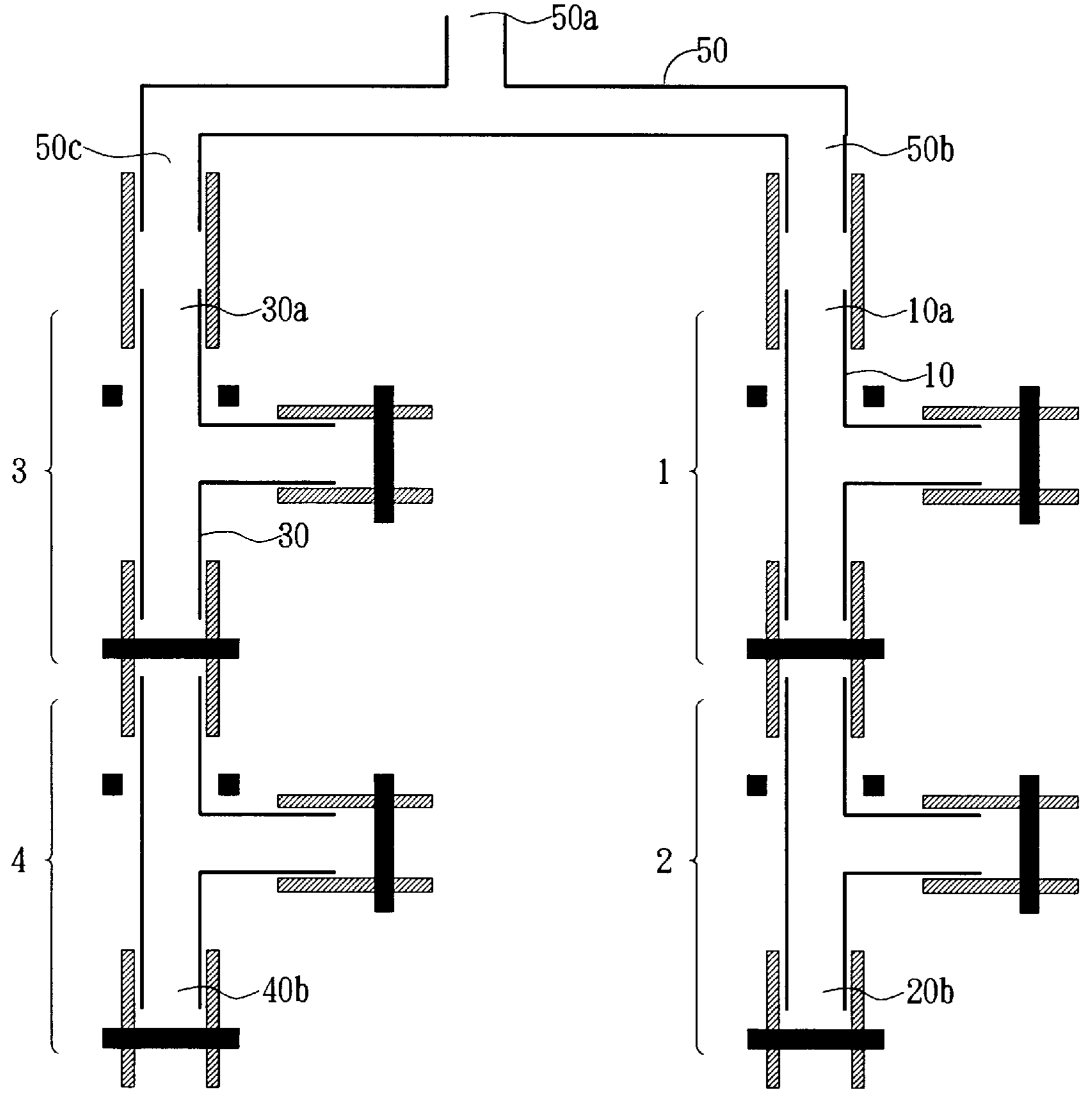
FIG. 8 is a another embodiment of the in-liquid substance separation apparatus of this invention.

Another configuration to prevent calluses from flowing in lumps is shown in FIG. 8, in which the fluid containing small substances that is supplied into one inlet port 50*a* of a branch passage 50 is branched and fed to two outlet ports 50*b* and 50*c*, which are connected to an inlet port 10*a* of branch tube 10 of a first separation/recovery unit 1 and to an inlet port 30*a* of branch tube 30 of a third separation/recovery unit 3. This construction consists of two parallel lines of two series connected units, the series connected units being identical to those shown in FIG. 2.

Table 4 shows comparison between the number of calluses supplied and the number of calluses recovered at the separation/recovery ports 20*b*, 40*b* under the same conditions as in the configuration of FIG. 2 except that two parallel lines of series connected units are used. Table 4 indicates that the use of the parallel branch tubes allows small substances such as calluses in a fluid to be separated into discrete ones.

TABLE 4

| Number of calluses supplied | Number of calluses recovered* | Number of recoveries* |
|---|---|---|
| 100 | 96 | 84 |
| 100 | 94 | 81 |
| 100 | 98 | 79 |
| 100 | 97 | 89 |

*The number of calluses recovered and the number of recoveries are the sums of the separation/recovery ports 20b and 40b.0

Table 2 and Table 3 have found that agitating the substances in the glass container or using a number of parallel branch tubes enhances the rate of separation/recovery of discrete substances.

Although the above embodiment uses a combination of T-shaped branch tubes, the branch tube may be formed into a structure having many branches in one piece.

The motor-driven pinch cocks, which are used in the above embodiment as an open-close means to flatten the elastic tube members connecting the series branch tubes, contribute to simplifying the construction and reducing the manufacture cost. These pinch cocks may be replaced with changeover valves such as solenoid valves.

Further, in the above embodiment, the on-off control of the compressor and the open-close control of the motor-driven pinch cocks in response to the signals from the sensors are performed by the microcomputer that operates according to a program. These controls can also be provided by common programmable controllers available on the market as long as they have a timer function to determine the control timings.

Although the above embodiment employs glass as the material of the tubes for ease of sterilization because the embodiment concerns the application of separating and recovering cultured cells, any material may be used where applications have no such requirements.

Because the above embodiment concerns a case of separating and recovering cultured cells, in which the necessary condition is to prevent the cells from being damaged, compressed air is used to supply fluid and cultured cells to the branch tube. In general applications, however, the necessary condition is that the flow has no pulsation (the material needs to be supplied in a constant volume at a constant rate).

The advantages of the in-fluid small substance separation apparatus of this invention may be summarized as follows. As described in claim 1, when a sensor detects a small substance in a fluid passing through the inlet port, an open-close means at the discharge port is closed and an open-close means at the separation/recovery port is opened, thus discharging the fluid from the discharge port and recovering small substances from the separation/recovery port. Because the liquid not containing small substances is discharged from the discharge port, it is possible to recover small substances reliably and in large amounts.

As described in claim 2, a plurality of small substance separation/recovery units are connected in series, with their separation/recovery port and inlet port interconnected through an open-close means. A clocking means of the open-close control means starts clocking a predetermined period-which is determined by the distance between a sensor and the separation/recovery port and the flow speed of the fluid-each time the sensor detects the small substances to control the timing of opening the open-close means at the discharge port so as to discharge the fluid from the discharge port when the small substance is not detected at the inlet port for a predetermined period. This arrangement minimizes the amount of fluid not containing the small substances that is discharged from the separation/recovery port. As a result, the recovered substances have a reduced content of liquid.

As described in claim 3, an inlet of a branch tube is branched into a plurality of outlets, each of which is connected to an inlet of each of separation/recovery units. This construction ensures that even if small substances are supplied in lumps into the inlet of the branch tube, they are scattered and broken into smaller lumps by a plurality of branches, reducing the likelihood of the small substances being discharged in lumps at the outlets of the separation/recovery units. This in turn allows the small substances in a fluid to be separated into discrete substances reliably in a large amount.

As described in claim 4, compressed air is injected into a container accommodating a fluid containing small substances to deliver the fluid containing the small substances to the inlet port of a branch tube at a constant flow rate. This ensures that very delicate substances are supplied to the inlet of the branch tube without being damaged.

With this invention, it is possible to extract discrete substances one by one from a lump of small substances by means of a simple construction. This invention can be applied not only to separation and recovery of small substances but also to alignment of substances at equal intervals.

What is claimed is:

1. An in-liquid small substance separation apparatus comprising at least one small substance separation/recovery unit, said unit including:

means for delivering a fluid containing small substances at a constant flow rate;

a branch tube having an inlet port into which said fluid containing small substances is supplied at a constant flow rate, a discharge port for discharging only the fluid, and a separation/recovery port for separating and recovering small substances from the fluid supplied to said inlet port;

a sensor for detecting small substances in the fluid passing through said inlet port;

a pair of open-close means, one for opening and closing each said discharge port and said separation/recovery port, respectively;

open-close control means for closing the open-close means at said discharge port and opening said open-close means at said separation/recovery port when said sensor detects the small substances; and timer means for initiating clocking for a predetermined period when said sensor detects the small substances, said predetermined period being determined by the distance between said sensor and said separation/recovery port and the flow rate of the fluid;

wherein said open-close means at said discharge port opens or closes according to the clocking of the predetermined period by said timer means.

2. An in-liquid small substance separation apparatus as claimed in claim 1, wherein said apparatus comprises a plurality of small substance separation/recovery units connected in parallel by a distribution tube having an inlet port and multiple outlets connected to the inlet ports of the branch tubes of said plurality of small substance separation/recovery units, the inlet of said distribution tube receiving an incoming fluid containing small substances for feeding the fluid to said multiple outlets.

3. An in-liquid small substance separation apparatus comprising at least one small substance separation/recovery unit, said unit including:

means for delivering a fluid containing small substances at a constant flow rate;

a branch tube having an inlet port into which said fluid containing small substances is supplied at a constant flow rate, a discharge port for discharging only the fluid, and a separation/recovery port for separating and recovering small substances from the fluid supplied to said inlet port;

a sensor for detecting small substances in the fluid passing through said inlet port;

a pair of open-close means, one for opening and closing each said discharge port and said separation/recovery port, respectively;

open-close control means for closing the open-close means at said discharge port and opening said open-close means at said separation/recovery port when said sensor detects the small substances, wherein said apparatus comprises a plurality of small substance separation/recovery units connected in series, a first of the plurality of said separation/recovery ports and a successive one of the plurality of said inlet ports being interconnected through one of said pair of open-close means;

said open-close control means has timer means for initiating clocking for a predetermined period when said sensors detect the small substances, said predetermined period being determined by the distance between said sensors and the plurality of said separation/recovery ports and the flow rate of the fluid; and said open-close means at said discharge port opens or closes according to the clocking of the predetermined period by said timer means.

4. An in-liquid small substance separation apparatus as claimed in any one of claims 1 to 3, wherein compressed air is injected into a container accommodating a fluid containing small substances to deliver by pressure the fluid containing small substances at a constant flow rate into said inlet port of said at least one small substance separation/recovery unit or into a first inlet port of said plurality of small substance separation/recovery units connected in series or into said distribution tube of said plurality of small substance separation/recovery units connected in parallel.

5. An in-liquid small substance separation apparatus as claimed in any one of claims 1 or 3, wherein said apparatus further comprises a transparent tube portion and said sensor further includes a pair of optical fiber sensor arrays opposing one another with said transparent tube portion being disposed therebetween.

6. An in-liquid small substance separation apparatus comprising at least one small substance separation/recovery unit, said unit including:

means for delivering a fluid containing small substances at a constant flow rate;

a branch tube having an inlet port into which a fluid containing small substances is supplied at a constant flow rate, a discharge port for discharging only the fluid, and a separation/recovery port for separating and recovering small substances from the fluid supplied to said inlet port;

a sensor for detecting small substances in the fluid passing through said inlet port;

a pair of open-close means, one for opening and closing each said discharge port and said separation/recovery port, respectively; and open-close control means for closing the open-close means at said discharge port and opening said open-close means at said separation/recovery port when said sensor detects the small substances;

wherein opening tips of said separation/recovery port and said discharge port of said branch tube or tubes are covered by a part of elastic tubes made of silicone resin to form said separation/recovery port and said discharge port, respectively, wherein the part of said elastic tubes not covering said separation/recovery port and said discharge port are provided with motor-driven pinch cocks that open and close said separation/recovery port and discharge port, respectively.

7. An in-liquid small substance separation apparatus of claim 6, wherein:

said apparatus comprises a plurality of small substance separation/recovery units connected in series, a first of the plurality of said separation/recovery ports and a successive one of the plurality of said inlet ports being interconnected through one of said pair of open-close means;

said open-close control means has timer means for initiating clocking for a predetermined period when said sensors detect the small substances, said predetermined period being determined by the distance between said sensors and the plurality of said separation/recovery ports and the flow rate of the fluid; and said open-close means at said discharge port opens or closes according to the clocking of the predetermined period by said timer means.

8. An in-liquid small substance separation apparatus of claim 6, wherein:

said apparatus comprises a plurality of small substance separation/recovery units connected in parallel by a distribution tube having an inlet port and multiple outlets connected to the inlet ports of the branch tubes of said plurality of small substance separation/recovery units, the inlet of said distribution tube receiving an incoming fluid containing small substances for feeding the fluid to said multiple outlets.

* * * * *